(12) United States Patent
Mol

(10) Patent No.: US 7,389,701 B2
(45) Date of Patent: Jun. 24, 2008

(54) METHOD AND SENSOR ARRANGEMENT FOR LOAD MEASUREMENT ON ROLLING ELEMENT BEARING BASED ON MODEL DEFORMATION

(75) Inventor: Hendrik Anne Mol, Sleeuwijk (NL)

(73) Assignee: AB SKF, Gothenburg (SE)

( * ) Notice: Subject to any disclaimer, the term of this patent is extended or adjusted under 35 U.S.C. 154(b) by 253 days.

(21) Appl. No.: 10/573,485

(22) PCT Filed: Sep. 16, 2004

(86) PCT No.: PCT/NL2004/000641

§ 371 (c)(1),
(2), (4) Date: Mar. 24, 2006

(87) PCT Pub. No.: WO2005/040745

PCT Pub. Date: May 6, 2005

(65) Prior Publication Data

US 2007/0143039 A1 Jun. 21, 2007

(30) Foreign Application Priority Data

Sep. 24, 2003 (NL) .................................. 1024372

(51) Int. Cl.
*G01L 3/14* (2006.01)

(52) U.S. Cl. .................................................. 73/862.322
(58) Field of Classification Search ............. 73/862.322
See application file for complete search history.

(56) References Cited

U.S. PATENT DOCUMENTS

| 5,952,587 A | 9/1999 | Rhodes et al. |
| 2002/0057856 A1 | 5/2002 | Bailey et al. |
| 2007/0074587 A1* | 4/2007 | Mol et al. ............... 73/862.322 |

* cited by examiner

*Primary Examiner*—Michael Cygan
*Assistant Examiner*—Octavia Davis
(74) *Attorney, Agent, or Firm*—Buchanan Ingersoll & Rooney PC

(57) ABSTRACT

Method and sensor arrangement for determining a load vector acting on a rolling element bearing (1) in operation. A plurality of N sensors (8) are provided which measure displacement and/or strain for determining displacement and/or strain in one of the elements (5, 6, 7) of the rolling element bearing (1). Furthermore, a mode shape coefficients calculator (11) is provided, connected to the plurality of N sensors (8), for determining a deformation of the element (5, 6, 7) by calculating amplitude and phase of N/2 Fourier terms representing at least one radial mode shape of the ring shape element (5, 6, 7). Also, a bearing neural network (12) is present, connected to the mode shape coefficients calculator (11), the bearing neural network (12) being trained to provide the load vector on the rolling element bearing (1) from the N/2 Fourier terms.

20 Claims, 2 Drawing Sheets

METHOD AND SENSOR ARRANGEMENT FOR LOAD MEASUREMENT ON ROLLING ELEMENT BEARING BASED ON MODEL DEFORMATION

FIELD OF THE INVENTION

The present invention relates to load measurements on rolling element bearings, such as ball bearings or roller bearings. More specifically, the present invention relates to a method and sensor arrangement for determining a load vector acting on a rolling element bearing, comprising measuring displacement and/or strain using N sensors for determining displacement and/or strain in a ring shaped element of the rolling element bearing.

PRIOR ART

Such a load measuring method and sensor arrangement are e.g. known from American patent U.S. Pat. No. 5,140,849, which describes a rolling element bearing with a sensor unit. The sensor unit comprises two sensor elements, in the form of strain gauges, which effectively measure a number of performance characteristics of the bearing, including the applied load, rotational speed and acceleration.

However, this known sensor arrangement is not capable of measuring the total load vector applied to the bearing. Presumptions are made based on the bearing configuration (mostly empirical) how the load on the bearing is sensed by the two sensor elements, and thus how the load on the bearing can be determined from the sensor element signals. Also, due to the non-linear nature of a bearing, a relative straightforward vibration measurement method using the ball pass frequency is not sufficient to determine the loading on the bearing in a general sense.

SUMMARY OF THE INVENTION

The present invention seeks to provide an improved method and sensor arrangement for determining the load on a roller bearing, which is capable to determine the complete load vector on the bearing, i.e. three orthogonal force components and two moments (the moment around the rotation axis of the bearing being of no importance).

According to a first aspect of the present invention, a method is provided according to the preamble defined above, in which the method further comprises determining a deformation of the element by calculating amplitude and phase of N/2 Fourier terms representing at least one radial mode shape of the ring shaped element, and feeding the N/2 Fourier terms to a bearing neural network, the bearing neural network being trained to provide the load vector on the rolling element bearing from the N/2 Fourier terms. The bearing element of which a deformation is measured using the sensors, may be the inner or outer ring, or even one of the rolling elements.

This method has the advantage that it is possible to determine the load vector in all orthogonal dimensions on all positions of the rolling element bearing component by using measurements of the component deformation. It has been found that it is possible to train a neural network to provide the load vector as an output result, using the calculated mode shape coefficients as input, where the relationship between the input signals or data and the output result is a non-linear relationship.

In a further embodiment, the rolling element bearing comprises two rows of coaxial bearings, the ring shaped element of the rolling element bearing being the bearing outer ring of one of the two rows of coaxial bearings. It has been found, that using only measurements from a single row, it is possible to obtain the load vector on the bearing arrangement as a whole.

The N sensors may comprise strain sensors in a further embodiment, and the at least one radial mode shape comprises a mode shape of order zero and one or more mode shapes of order two or higher. Using strain sensors, displacement (zero order mode shape) of the bearing element can not be measured, but using the present method, it is still possible to obtain a load vector result with sufficient accuracy.

In an even further embodiment, the N sensors comprise displacement sensors, and the at least one radial mode shape comprises one or more mode shapes of order zero and higher. Using displacement sensors, measurement data relating to all mode shapes which together form the bearing element deformation may be obtained, yielding a higher accuracy of the resulting load vector.

To further improve the measurement result quality, N/2 Chebyshev polynomial coefficients are determined from the sensor signals, representing at least one axial mode shape of the ring shaped element.

The bearing neural network is, in a further embodiment, trained using a plurality of data sets, each data set comprising a predefined load vector on a specific type of rolling element bearing and associated measurement data from the N sensors.

In a further aspect, the present invention relates to a sensor arrangement for determining a load vector acting on a rolling element bearing in operation, the sensor arrangement comprising a plurality of N sensors for measuring displacement and/or strain for determining displacement and/or strain in one of the elements of the rolling element bearing, a mode shape coefficients calculator, connected to the plurality of N sensors, for determining a deformation of the element by calculating amplitude and phase of N/2 Fourier terms representing at least one radial mode shape of the ring shaped element, and a bearing neural network, connected to the mode shape coefficients calculator, the bearing neural network being trained to provide the load vector on the rolling element bearing from the N/2 Fourier terms. This sensor arrangement provides advantages comparable to the advantages discussed above in relation to the present method. Embodiments of the present sensor arrangement are described in the dependent sensor arrangement claims.

SHORT DESCRIPTION OF DRAWINGS

The present invention will now be explained in further detail using a number of exemplary embodiments, with reference to the accompanying drawings, in which FIG. 1 shows a cross sectional view of a rolling element bearing provided with a number of displacement sensors;

DETAILED DESCRIPTION OF EXEMPLARY EMBODIMENTS

Figure 1:
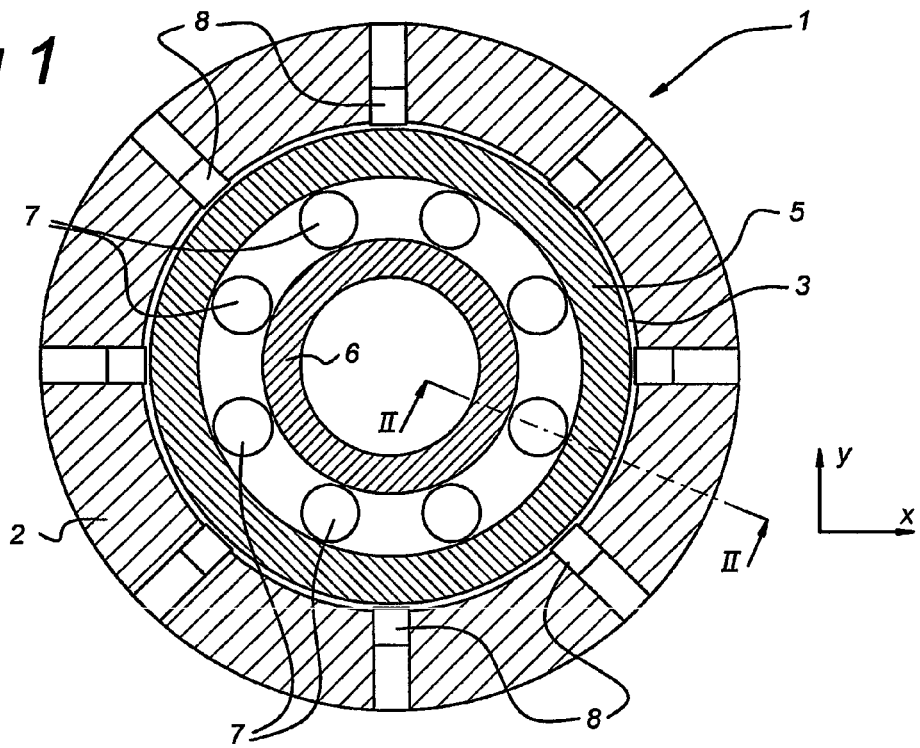

In FIG. 1 a cross sectional view is shown of a rolling element bearing 1, e.g. a ball bearing or roller bearing. The rolling element bearing 1 comprises an outer ring 5, an inner ring 6 and a number of rolling elements 7, such as balls or rollers (the number of rolling elements 7 being eight in the drawing). The outer ring 5 of the rolling element bearing 1 is fixed in a sensor holder 2, which forms the fixed world for the rolling element bearing 1. In the sensor holder 2 eight sensors 8 are provided at locations facing the bearing outer ring 5 with (angular) spacing corresponding to the angular spacing of the rolling elements 7 of the bearing 1. The sensors 8 may e.g. be displacement sensors or vibration sensors, known as such to the person skilled in the art.

Figure 2:
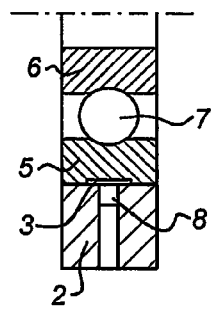
FIG. 2 shows a cross sectional view of the rolling element bearing of FIG. 1 across the line II-II.

As shown in the cross sectional view of FIG. 2, the bearing outer ring 5 is provided with a recession 3 at its outer periphery. The outer surfaces of the bearing outer ring 5 are in close contact with the sensor holder 2. The sensors 8 can thus monitor any deformation of the surface of the recession 3 of the outer ring 5 as a result of the rolling elements 7 passing by and the force vector applied to the bearing 1.

For the person skilled in the art, it will be clear that the circumferential recession 3 may also be provided in the sensor holder 2, such that a (local) deformation of the outer surface of the bearing outer ring 5 is possible. It will also be clear to the person skilled in the art, that it is possible to use sensors 8 monitoring the inner surface of the bearing inner ring 6, and that the bearing inner ring 6 (or the supporting inner ring holder analogue to the sensor holder 2) may be provided with a circumferential recession 3.

In FIG. 1, also an x-axis and y-axis are indicated, a z-axis being defined as being orthogonal to both the x- and y-axis (extending perpendicular to the surface of the drawing). Furthermore, two rotational axes may be defined, e.g. rotational axes around the x- and y-axis, respectively. In general, the rolling element bearing 1 is in operation subjected to a force vector $\bar{f}$, comprising three force elements in the x-, y- and z-direction, respectively, and two moment elements around the x- and y-axis, respectively.

Figure 3:
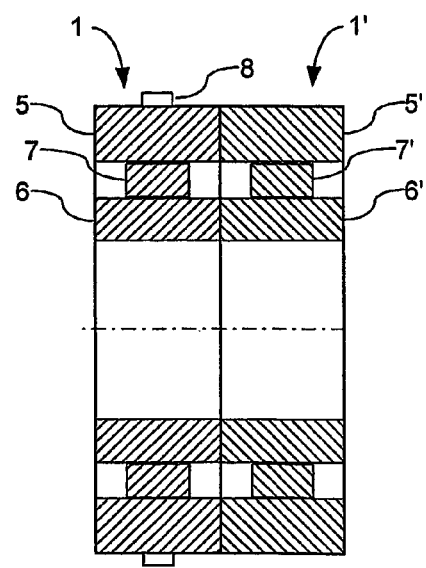
FIG. 3 shows a block diagram of a sensor arrangement according to an embodiment of the present invention.

Bearings are more and more made in the form of units containing two rows of bearings that can cope with a combination of axial forces, radial forces and bending moments. An example of such a bearing unit 10 having two rows of bearings 1,1', is shown in FIG. 3. Such units 10 may be used as the wheel bearing of a modern car, that consists of a flange or beam to mount the bearing unit 10 to the structure and a rotating part that is connected to the wheel.

In general, the load on a bearing unit 10 can include forces in three directions as well as moments over the three axes. The forces and moments on the bearing unit 10 lead to predominantly radial and axial forces on the individual bearing rows 1,1' in the unit 10. The outer ring 5 of the unit 10 responds to the forces on the rows 1,1' by deforming elastically.

Basic to the present invention is the understanding that any mechanical object, such as the bearing inner or outer ring 5, 6, or also the rolling elements 7, can only be deformed according to its natural mode shapes. According to component mode synthesis (CMS) technique, the natural mode shapes can be described using a specific set of equations, as e.g. described in J. A. Wensing, 'On the dynamics of ball bearings', ISBN 90-36512298, which is incorporated herein by reference.

The outer ring 5 deformation is the sum of forced modes (mode shapes) of the unit 10 and it is known that these can be described with polynomial functions. The deformation is, in an embodiment, described with Fourier series for the circumferential direction and e.g. Chebyshev polynomials for the direction parallel to the axis of rotation of the bearing unit 10.

It is not strictly necessary to determine the mode shapes in the axial direction. It is found that circumferential information on one row 1,1' of such a bearing unit 10 is sufficient. However, it has been found that using measurements relating to the axial mode shapes allows to determine the contact angle of the load.

The circumferential Fourier terms are measured by using an adequate amount of sensors 8 that measure the displacement and/or the strain. Note that strain measurement can determine modes 0 ("breathing mode"), 2 (oval deformation), 3 (triangular deformation) etc. but not mode 1 (rigid body movement). Displacement measurement can determine the radial mode shapes including the rigid body mode determining the relative displacement of inner ring 6 against outer ring 5 on regularly spaced locations. With N sensors 8, it is possible to determine the amplitude and phase of N/2 different Fourier terms that represent the radial mode shape of the ring 5.

In the embodiment shown in FIG. 3, a single row 1 is fitted with associated sensors 8. In a further embodiment, both rows 1,1' may be fitted with sensors 8, allowing to determine the load on the bearing with higher accuracy and robustness.

The mode amplitudes and phases are a function of the radial and axial forces on the bearing row 1,1' that is measured. The load on a bearing row 1,1' is the sum of the individual contact forces in that row 1,1'.

The outer ring 5 of the bearing unit 10 is deforming due to the forces but the deformation is influenced by the contact stiffness of the individual rolling contacts. The amplitude of the individual mode shapes is therefore not linearly coupled to the loads. The amplitudes of the modes that describe the deformations however are all monotonously dependent on the load. In practice, non-linear Artificial neural networks are very capable of reconstructing the net loading on a bearing unit 10 from the non-linear input.

Figure 4:
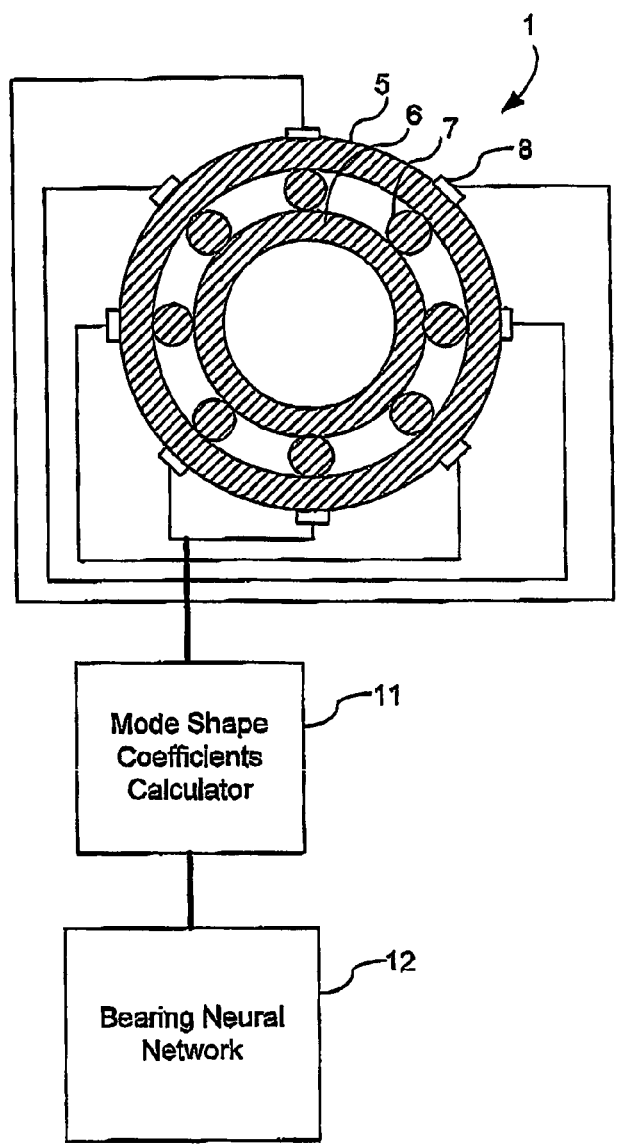
FIG. 4 is a schematic diagram of a sensor arrangement.
Figure 5:
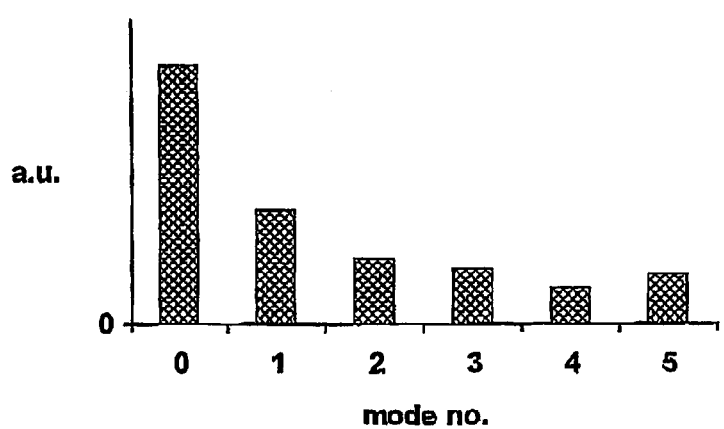
FIG. 5 is a plot of the amplitude values of mode shapes for modes 0 to 5.

In FIG. 4, a schematic diagram is shown of a sensor arrangement according to an embodiment of the present invention. The sensors 8 are connected in parallel to a mode shape coefficient calculator 11, which is arranged to derive the amplitude and phase values of the generalized mode shapes from the input signals of the sensors 8. As an example, FIG. 5 shows a plot of the amplitude values of mode shapes for a specific arrangement, for the modes 0 to 5.

The amplitude and phase of the mode shapes are input to a bearing neural network 12, which has been trained to provide the bearing load using the amplitude and phase signals as input Design and training of a neural network to provide an output signal from a plurality of input signals, where a non-linear relationship exists between the input signals and the output signal, is well known in the art, and needs no further explanation. The neural network can e.g. be trained using data sets, where each data set comprises a load vector actually applied to the bearing unit 10 (desired output of neural network 12) and the measured (and processed) sensor data associated with that load vector. In general, the non-linear relationship mentioned is dependent on the type of bearing unit 10 used, and possibly also dependent on mounting specifics. In that case, the bearing neural network 12 is trained for that specific situation.

The mode shape coefficients calculator 11 and bearing neural network 12 may each be implemented using a general purpose computer or a dedicated signal processing system, or in combination. The mode shape coefficients calculator 11 and bearing neural network 12 be further connected to memory means (not shown) for storing parameters, data and processing results. Also, the bearing neural network 12 may be connected to interface means (not shown), e.g. for providing an output of processed results on a display or printer.

The mode shape coefficients calculator 11 is arranged to process the signals from the sensors 8, and may comprise e.g. filters, amplifiers, etc., or digital signal processing means, such as analog-to-digital converters, digital filters, arithmetic logic units, etc., or a combination of both.

When it is known in advance, e.g. due to the construction in which the rolling element bearing 1 is used, that the force vector will be directed in mainly one direction, it is sufficient to use a smaller number of sensors 8 in the present sensor assembly. If it is e.g. known that the force vector will be predominantly directed in a single direction, it may be sufficient to provide only e.g. three sensors adjacent to each other in that direction, because that will be the only region of the outer ring 5 were deformations will occur. This simplifies the sensor assembly, while retaining sufficient accuracy.

The invention claimed is:

1. Method for determining a load vector acting on a rolling element bearing, in which the method comprises: measuring displacement and/or strain using N sensors for determining displacement and/or strain in a ring shaped elements of the rolling element bearing; determining a deformation of the element by calculating amplitude and phase of N/2 Fourier terms representing at least one radial mode shape of the ring shaped element; feeding the N/2 Fourier terms to a bearing neural network, the bearing neural network being trained to provide the load vector on the rolling element bearing from the N/2 Fourier terms.

2. Method according to claim 1, in which the rolling element bearing comprises two rows of coaxial bearings, the ring shaped element of the rolling element bearing being the bearing outer ring of one of the two rows of coaxial bearings.

3. Method according to claim 1, in which the N sensors comprise strain sensors, and the at least one radial mode shape comprises a mode shape of order zero and one or more mode shapes of order two or higher.

4. Method according to claim 1, in which the N sensors comprise displacement sensors and the least one radial mode shape comprises one or more mode shapes of order zero and higher.

5. Method according to claim 1, further comprising determining N/2 Chebyshev polynomial coefficients from the N sensor signals, representing at least one axial mode shape of the ring shaped element.

6. Method according to claim 1, in which the bearing neural network is trained using a plurality of data sets, each data set comprising a predefined load vector on a specific type of rolling element bearing and associated measurement data from the N sensors.

7. Sensor arrangement for determining a load vector acting on a rolling element bearing in operation, the sensor arrangement comprising a plurality of N sensors which measure displacement and/or strain for determining displacement and/or strain in one of the elements of the rolling element bearing; a mode shape coefficients calculator, connected to the plurality of N sensors, for determining a deformation of the element by calculating amplitude and phase of N/2 Fourier terms representing at least one radial mode shape of the ring shaped element; a bearing neural network, connected to the mode shape coefficients calculator, the bearing neural network being trained to provide the load vector on the rolling element bearing from the N/2 Fourier terms.

8. Sensor arrangement according to claim 7, in which the rolling element bearing comprises two rows of coaxial bearings, the ring shaped element of the rolling element bearing being the bearing outer ring of one of the two rows of coaxial bearings.

9. Sensor arrangement according to claim 7, in which the N sensors comprise strain sensors, and the at least one radial mode shape comprises a mode shape of order zero and one or more mode shapes of order two or higher.

10. Sensor arrangement according to claim 7, in which the N sensors comprise displacement sensors, and the at least one radial mode shape comprises one or more mode shapes of order zero or higher.

11. Sensor arrangement according to claim 7, in which the mode shape coefficient calculator is further arranged to determine N/2 Chebyshev polynomial coefficients representing at least one axial mode shape of the ring shaped element.

12. Sensor arrangement according to claim 7, in which the bearing neural network is trained using a plurality of data sets, each data set comprising a predefined load vector on a specific type of rolling element bearing and associated measurement data from the N sensors.

13. Sensor arrangement according to claim 7, in which the bearing inner ring or outer ring are attached to a sensor holder, a circumferential recession being provided between at least part of the contacting surfaces of the inner ring or outer ring and the sensor holder.

14. Method according to claim 2, further comprising determining N/2 Chebyshev polynomial coefficients from the N sensor signals, representing at least one axial mode shape of the ring shaped element.

15. Method according to claim 2, in which the bearing neural network is trained using a plurality of data sets, each data set comprising a predefined load vector on a specific type of rolling element bearing and associated measurement data from the N sensors.

16. Sensor arrangement according to claim 8, in which the N sensors comprise strain sensors, and the at least one radial mode shape comprises a mode shape or order zero and one or more mode shapes of order two or higher.

17. Sensor arrangement according to claim 8, in which the N sensors comprise displacement sensors, and the at least one radial mode shape comprises one or more mode shapes of order zero or higher.

18. Sensor arrangement according to claim 8, in which the bearing inner ring or outer ring are attached to a sensor holder, a circumferential recession being provided between at least part of the contacting surfaces of the inner ring or outer ring and the sensor holder.

19. Sensor arrangement according to claim 9, in which the bearing inner ring or outer ring are attached to a sensor holder, a circumferential recession being provided between at least part of the contacting surfaces of the inner ring or outer ring and the sensor holder.

20. Sensor arrangement according to claim 10, in which the bearing inner ring or outer ring are attached to a sensor holder, a circumferential recession being provided between at least part of the contacting surfaces of the inner ring or outer ring and the sensor holder.

* * * * *